C. E. MILLER.
AIRLESS AND PUNCTURELESS AUTOMOBILE TIRE.
APPLICATION FILED DEC. 14, 1912.
1,065,162.
Patented June 17, 1913.
2 SHEETS—SHEET 1.
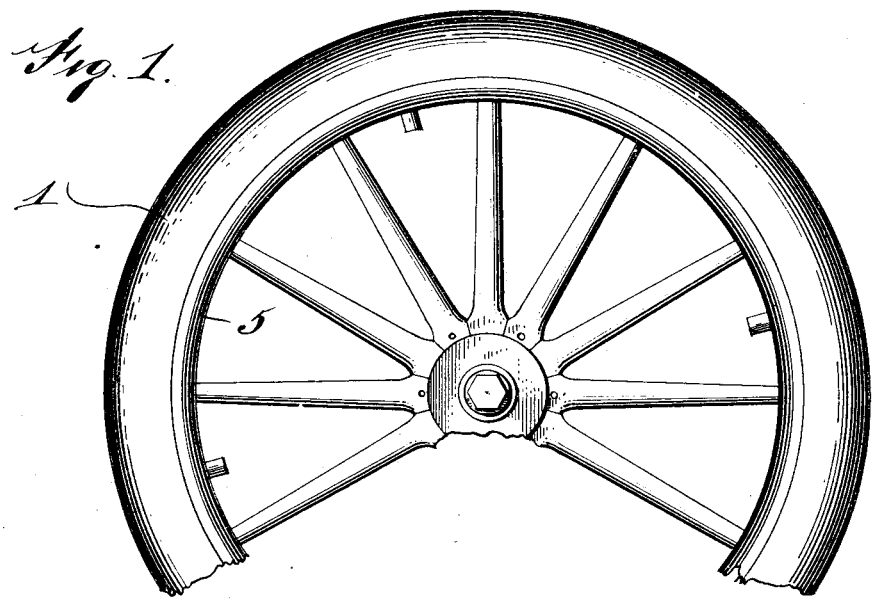
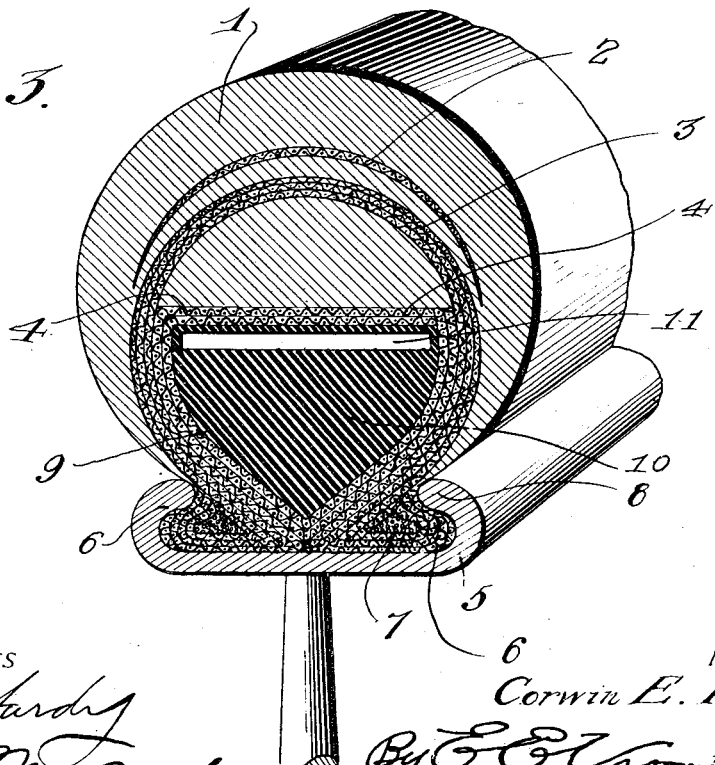
WITNESSES
INVENTOR
Corwin E. Miller
By E. E. Vrooman
his Attorney

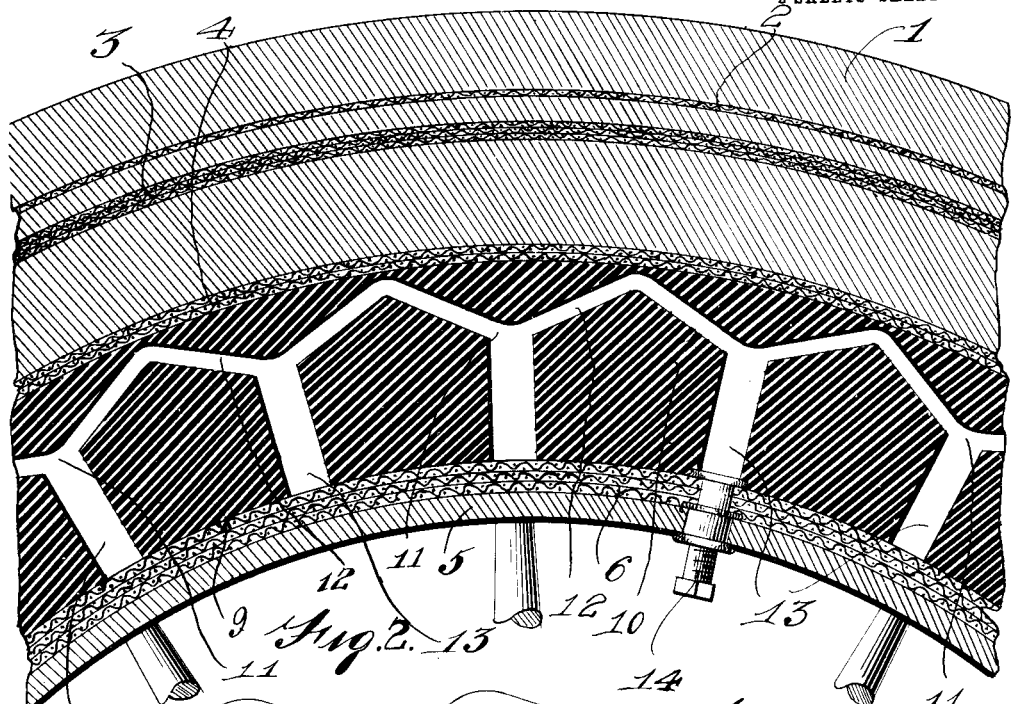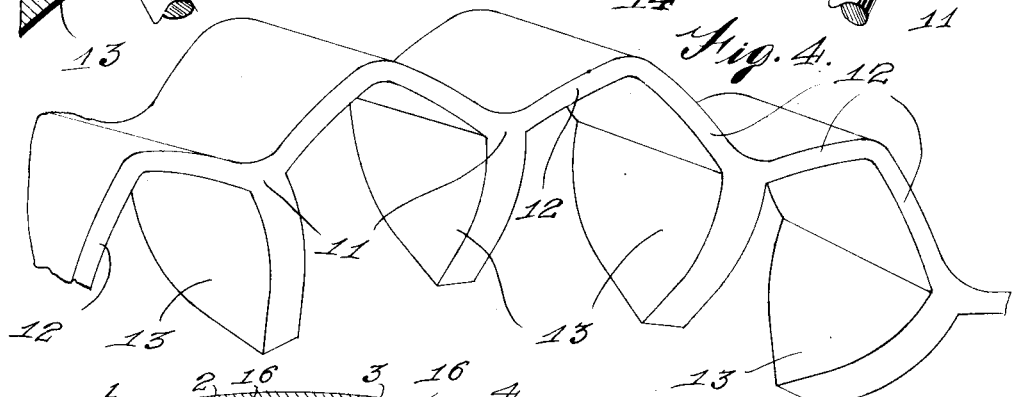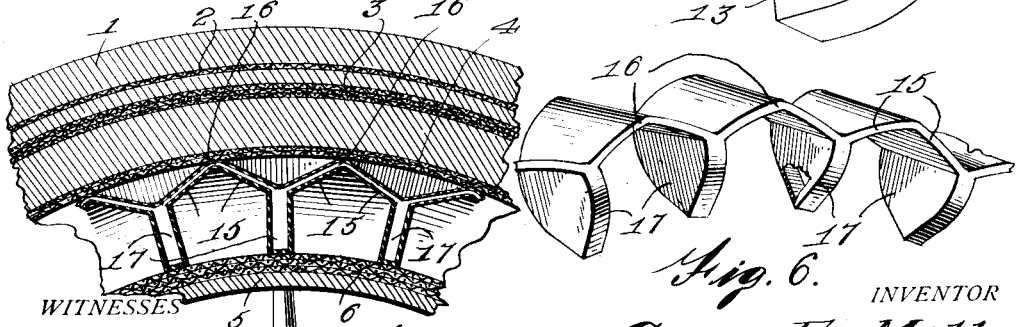

UNITED STATES PATENT OFFICE.

CORWIN E. MILLER, OF PERU, INDIANA.

AIRLESS AND PUNCTURELESS AUTOMOBILE-TIRE.

1,065,162.  Specification of Letters Patent.  Patented June 17, 1913.

Application filed December 14, 1912. Serial No. 736,833.

*To all whom it may concern:*

Be it known that I, CORWIN E. MILLER, a citizen of the United States, residing at Peru, in the county of Miami and State of Indiana, have invented certain new and useful Improvements in Airless and Punctureless Automobile-Tires, of which the following is a specification, reference being had therein to the accompanying drawing.

This invention relates to tires and has for its object the production of a tire which is puncture proof and which will possess the same resiliency as an ordinary inflated tire.

Another object of this invention is the production of a simple and efficient means for supporting the tire in such a manner as to allow the same to possess the desired resiliency.

With these and other objects in view, this invention consists of certain novel constructions, combinations and arrangements of parts, as will be hereinafter fully described and claimed.

In the drawings: Figure 1 is a side elevation of a wheel provided with the improved tire. Fig. 2 is a longitudinal section through the tire. Fig. 3 is a transverse sectional view through the tire. Fig. 4 is a diagram in perspective showing the arrangement of the air channels. Fig. 5 is a sectional view through a portion of the tire showing the modified form of air tube connected thereto. Fig. 6 is a detail perspective showing the modified form of air tube which may be employed in connection with the present tire.

By referring to the drawings by numerals, it will be seen that 1 designates the tread of the tire which is preferably formed of a composition of rubber, and a reinforcing or breaker strip 2 is embedded within the tread 1. A carcass 3 of the tire is formed of a plurality of layers of fabric and constitutes an efficient reinforcement for the tread 1 and produces an efficient resistance against the entrance of sharp articles which would tend to puncture the tire. The tire is also provided upon its inner portion with a stay strip 4 which stay strip 4 is formed of a plurality of fabric layers and constitutes an inner lining for the tread 1. The bottom of the tire is formed of the usual shape so as to fit the rim 5 and the clamping portions 6 are reinforced by means of a plurality of closely arranged longitudinally extending wires 7 which are adapted to fit in the tire adjacent the rolled portions 8 of the rim 5 so as to efficiently hold the tire in engagement with the rim 5.

A cushion compartment 9 is formed within the tire and this cushion compartment contains a soft rubber cushion or casing 10 which is provided with an air passage-way 11, and this soft rubber cushion is adapted to support the tread of the tire in an expanded condition so as to yieldably support the same. The passage-way 11 is formed of a zigzag structure so as to constitute substantially V-shaped channels 12 which terminate at their lower apexes in inwardly extending air passage-ways 13. Air outlet pipes 14 are connected to some of the passage-ways 13 so as to allow the escapement of air which may be contained within the tire so as to relieve the passage-way 11 from the air contained therein. It will, therefore, be seen that as the tire yields inwardly, the hot air which may have accumulated within the channels 12 may escape through the discharge pipes 14. There are preferably four of these discharge pipes 14 upon a wheel so as to carry off the compressed air within the passage-way 11.

As indicated in Fig. 4 the channels are formed of a series of alternately raised and lowered passage-ways, each passage-way being provided with an air accumulating space at its lower end which communicates with two of the converging or inclined passage-ways. There is a vertically extending air-receiving space 13 between each of the converging channels 12 as is clearly illustrated in the diagrammatic view as illustrated in Fig. 4.

As illustrated in Figs. 5 and 6, the device may be provided with an air passage channel casing 15 in place of a soft rubber cushion 9, which comprises a plurality of substantially V-shaped hump portions 16 which hump portions are connected at their lower ends with the depending air chambers 17. These hump portions 16 and air chambers 17 are hollow and communicate with a discharge pipe 18 for permitting the discharge of air from the air passage channel casing 15. As stated above, this casing may be placed within the compartment 9 and assist in holding the tire in its expanded condition.

From the foregoing description, it will be seen that owing to the fact that the tire is greatly reinforced by means of the transversely extending strip 4, the inner cushion 9 will be greatly protected, and considerable of the strain will be relieved therefrom. It should be understood, however, that the cushion 9 is formed of very soft and yieldable rubber so as to obtain the desired result of the cushion tire.

Having thus described the invention, what is claimed as new, is:—

1. A tire of the class described comprising a tread portion, reinforcing fabric strips carried thereby, a transversely extending stay strip carried by said tread, said tread provided with a cushion compartment, a soft rubber cushion positioned within said cushion compartment and adapted to add resiliency to said tire, said cushion provided with a circumferentially extending channel being formed to constitute a plurality of communicating substantially V-shaped channel portions, each substantially V-shaped channel portion terminating in a diverging air pocket, and outlet means coöperating with some of said air pockets for permitting the exhaust of hot air contained within said air channel.

2. A tire of the class described comprising a body provided with a cushion compartment, a cushion tube carried by said cushion compartment and constituting an air passage channel casing, said cushion being formed on a substantially zigzag shape comprising a plurality of substantially V-shaped integrally connected hump portions, an air chamber connected to the lower portion of each pair of hump portions and constituting an air reservoir, and a discharge tube communicating with some of said air reservoirs.

In testimony whereof I hereunto affix my signature in presence of two witnesses.

CORWIN E. MILLER.

Witnesses:
OLIVER J. TILLETT,
EDGAR P. KLING.